United States Patent

[11] 3,612,898

| [72] | Inventors | Thaddeus M. Doniguian<br>Laguna Beach;<br>Harry J. Kipps, South Laguna Beach, both of Calif. |
|---|---|---|
| [21] | Appl. No. | 835,946 |
| [22] | Filed | June 24, 1969 |
| [45] | Patented | Oct. 12, 1971 |
| [73] | Assignee | Signal Oil and Gas Company<br>Los Angeles, Calif. |

[54] PULSED CATHODIC PROTECTION APPARATUS AND METHOD
5 Claims, 2 Drawing Figs.

[52] U.S. Cl. .................................................. 307/95, 204/196
[51] Int. Cl. .................................................. B01d 13/02
[50] Field of Search .......................................... 307/95, 106, 107, 108; 204/147, 196; 321/15, 45 C

[56] References Cited
UNITED STATES PATENTS
3,371,232 2/1968 Hannan et al. ................ 321/15 X Primary Examiner—Herman J. Hohauser
Attorney—Donald W. Canady ABSTRACT: A pulsed cathodic protection apparatus and method in which charging of the capacitor means is through the earth between an anode bed and the pipe or other element to be protected, thereby eliminating the need for any resistor in the charging circuit. The apparatus and method effect voltage doubling, and are capable of achieving relatively high-frequency operation. In one embodiment, a circuit is provided for a center-tapped voltage source, whereas a second embodiment relates to a circuit for a voltage source which is not center-tapped.

INVENTORS
THADDEUS M. DONIGUIAN
HARRY J. KIPPS
ATTORNEYS.

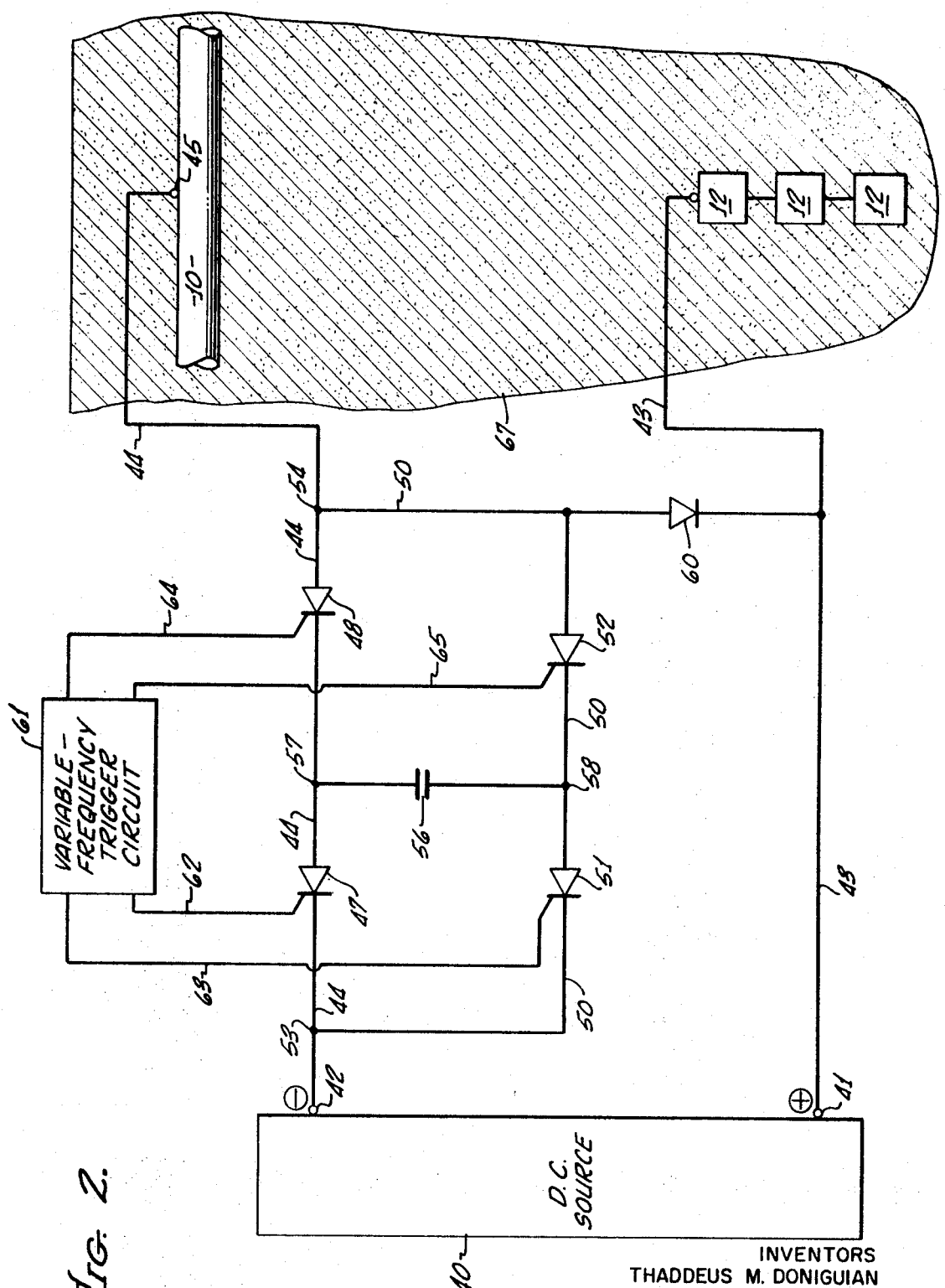

PULSED CATHODIC PROTECTION APPARATUS AND METHOD

BACKGROUND OF THE INVENTION

1. Field of the Invention

This invention relates to the field of cathodic protection systems, and more specifically to such systems wherein protection is effected by pulsing instead of by steady-state current flow.

2. Description of the Prior Art

It has been found that pulsed cathodic protection systems produce several advantages, namely, (a) a saving in power, and (b) achievement of cathodic protection with less stations than are otherwise required. Relative to the latter factor, with pulsed cathodic protection there is a greater "throw" of the voltage than with steady-state systems. "Throw" of voltage may be defined as the distance along a pipeline, for example, which may be protected by a single cathodic protection station (anode bed).

3,000 accordance with one prior art system for pulsed cathodic protection, a 60-Hz. wave was employed to fire thyristor (SCR) means. This, however, required operation at a single low frequency which, as discussed below, prevented maximizing of the throw of voltage. It is very desirable that the system be capable of operating at various relatively high frequencies, such as three or 4,000 Hz.

In accordance with another prior art system, the frequency could be varied but a serious disadvantage occurred in that the capacitor in the system was charged through a resistor. The use of the resistor not only necessitated an additional expensive component but resulted in loss of large amounts of power.

Accordingly, there exists a distinct need for a pulse-type cathodic protector the frequency of which is readily variable throughout a wide range including relatively high frequencies, and which does not require any resistor or other current-limiting element in the charging circuit for the capacitor. There also exists a need for a pulsed cathodic protection system in which there are no inductors, transformers, or resistors in the power circuitry. In addition, in many applications there is a need for a pulsed cathodic protection system which achieves a voltage doubling effect.

SUMMARY OF THE INVENTION

The invention comprises circuits and a method for charging a capacitor by current which flows through the earth or other medium, thus eliminating the need for any resistor. The circuits and method then effect discharging of such capacitor and immediate recharging thereof but at reverse polarity, whereby a voltage doubling effect is achieved. The circuits incorporate means for effecting positive turnoff of each thyristor, thus permitting operation at an empirically determined relatively high frequency which maximizes throw of voltage. Two specific circuits are provided, one for a two-wire source of DC voltage, and the other for a three-wire source.

BRIEF DESCRIPTION OF THE DRAWINGS

FIG. 2 is a schematic diagram of a second embodiment, wherein the voltage source is not center-tapped.

DETAILED DESCRIPTION OF THE PREFERRED EMBODIMENTS

Figure 1:
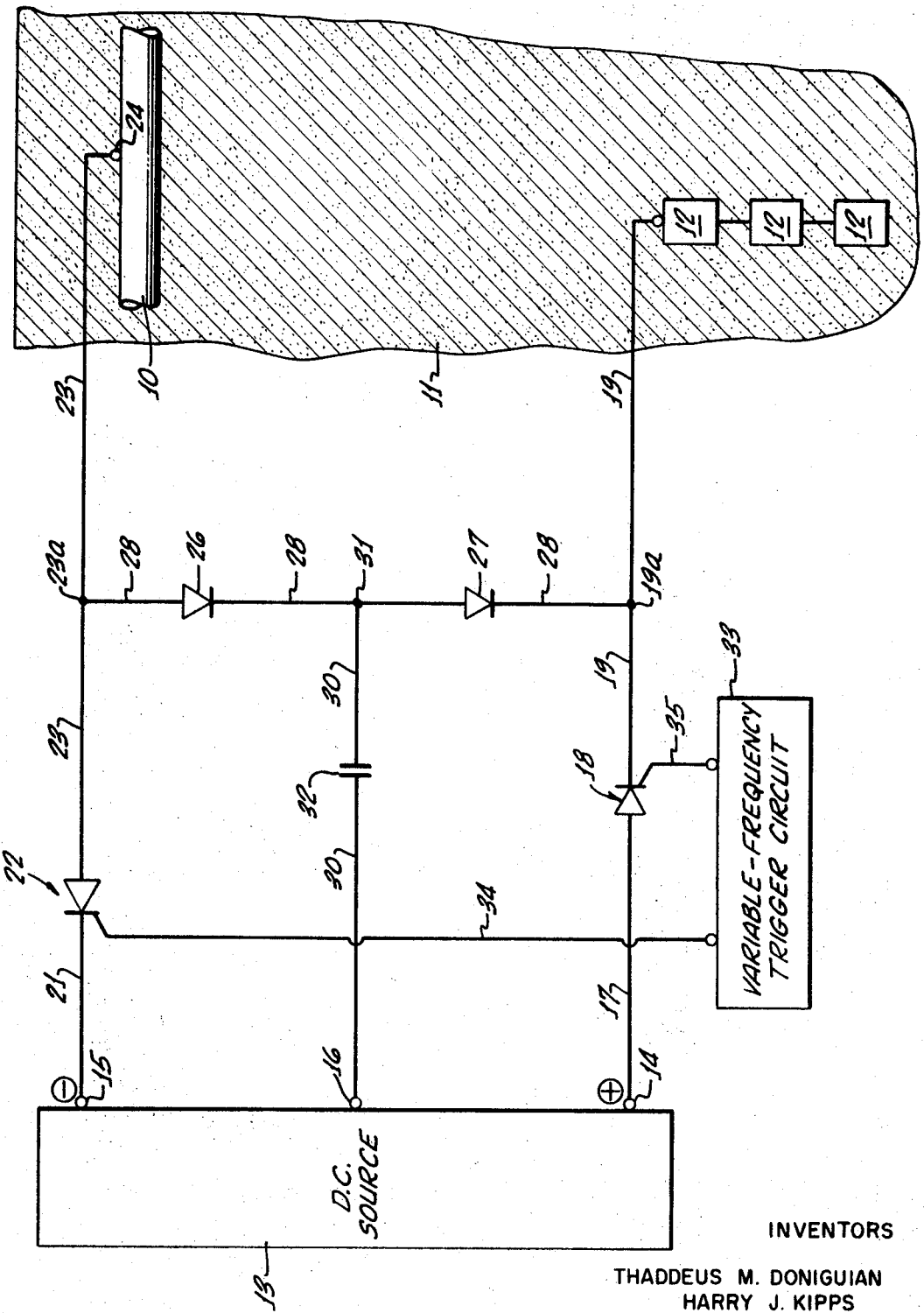
FIG. 1 is a schematic diagram of a first embodiment of the pulsed cathodic protection circuit, wherein the power is supplied to the circuit from a center-tapped source of DC voltage.

For purposes of illustration, the present invention is illustrated in effecting cathodic protection of a continuous metal pipeline or pipe 10 which is buried in earth 11. For this purpose, an anode bed 12 is buried in the earth 11 at a location far beneath the pipeline 10, for example several hundred feet therebeneath. As above indicated, there are other anode beds or stations at various points along the length of the pipeline.

The pipeline is electrically conductive, and is buried in an electrically conductive medium (the earth). The "medium," in which the "object" is to be cathodically protected is buried or immersed, may also be water or any other substance.

Referring specifically to the embodiment of FIG. 1, a suitable DC source 13 of the center-tapped type is illustrated as having a positive terminal 14, a negative terminal 15 and a neutral or zero-voltage terminal 16. Source 13 is, for example, a suitable rectifier adapted not only to rectify an AC input but also to provide appropriate filtering of the rectified wave.

The positive terminal 14 is connected through a lead 17 to the anode of a thyristor 18, whereas the cathode of such thyristor is connected through a lead 19 to the anode bed 12. Negative terminal 15 of source 13 is connected through a lead 21 to the cathode of a second thyristor 22. The anode of such thyristor 22 is connected through a lead 23 to a connection point 24 along the length of the continuous pipe or pipeline 10.

First and second series-related diodes 26 and 27 are interposed in a lead 28 which connects leads 19 and 23. The anode of diode 26 is directly connected to the lead 23, whereas the cathode of diode 27 is directly connected to lead 19.

An additional lead, numbered 30, is connected between the center or neutral terminal 16 and a point 31 on the central portion of lead 28. Lead 30 has interposed therein a capacitory 32. Accordingly, one side of capacitor 32 is directly connected to terminal 16, whereas the other side thereof is connected to point 31 and thus to the cathode of diode 26 and to the anode of diode 27.

The gating of the thyristors 18 and 22 may be effected by any of various standard trigger or gating circuits on of which is represented schematically at 33. Such gating circuit incorporates suitable means, such as a potentiometer, to change the frequency of the gating signals and thus the frequency of operation of the above-described cathodic protection circuit. One terminal of gating circuit 33 is connected through a lead 34 to the gate of thyristor 22, whereas the other terminal of such circuit 33 is connected through a lead 35 to the gate of thyristor 18.

The construction of the gating or trigger circuit 33 is such that thyristors 18 and 22 are triggered in alternation and (preferably) at equally spaced intervals. A typical gating frequency may be, for example, 2,000 or 3,000 Hz. or higher (such as 5,000 Hz.). The "gating frequency" is the number of pulses seen by the load. Thus, if there are to be 4,000 pulses applied between anode bed 12 and object 10 during each second, circuit 33 is set to supply 2,000 gating signals to lead 34 and 2,000 gating signals to lead 35 during each second.

DC source 13 may deliver, for example, a voltage of 300 volts between terminal 14 and 15, that is to say, 150 volts between terminal 16 and each of terminals 14 and 15. Such a voltage results from rectification of a 220-volt AC wave. The size of capacitor 32 may be, for example, 1 microfarad.

In the operation of the circuit of FIG. 1, let it be assumed that the gating circuit 33 first effects firing of thyristor 18. A circuit is thus completed from positive source terminal 14 through lead 17 and thyristor 18 to lead 19 and thus to the anode bed 12. From such bed, current flows through the earth 11 toward pipeline 10 as is required for cathodic protection thereof. After entering the pipe, the current flows through point 24 and lead 23 to point 23a on the latter, thence through diode 26 to point 31, and thence through lead 30 and capacitor 32 to neutral terminal 16.

Flow of current through the above-described circuit effects charging of capacitor 32 until the voltage thereof is only slightly higher than the source voltage between terminals 14 and 16 (150 volts in the example), despite the inertial effect incident to charging of the capacitor 32. The capacitor voltage may not rise to more than a slight amount greater than such source voltage (150 volts) due to the operation of diode 27 in clamping the voltage at the indicated level.

The capacitor 32 operates positively to turn off the thyristor 18 as soon as the capacitor voltage has risen to the value slightly above 150 volts. This is because the capacitor voltage then reverse biases the thyristor 18 to cause the same to cease conducting. This positive turn off of the thyristor 18 is important since it permits high-frequency operation.

The firing of thyristor 18 thus causes a short voltage pulse which effects a brief flow of current from anode bed 12 to pipe 10. Such voltage and current discontinue automatically upon charging of capacitor 32, and prior to the time of firing of thyristor 22 as next described.

A predetermined time period after firing of thyristor 18 (such predetermined time period being longer than the duration of the above-indicated voltage pulse), thyristor 22 is fired by the circuit 33 acting through lead 34. A circuit is thus completed from source terminal 16 through lead 30 and capacitor 32 to point 31, thence through a portion of lead 28 and through the diode 27 to a point 19a on lead 19, and thence through a portion of lead 19 to anode bed 12. Current then flows through the earth 11 toward the pipe 10, again as required for cathodic protection. The current then flows through point 24 to lead 23 and thence through thyristor 22 to terminal 15 of source 13.

The direction of current flow through capacitor 32 when thyristor 22 is fired is opposite to the direction of current flow therethrough when thyristor 18 is fired. Thus, firing of thyristor 22 first causes the capacitor to discharge and then immediately to charge again but with reverse polarity. As soon as capacitor 32 is thus charged to a value slightly above that of the voltage between terminals 15 and 16 (150 volts in the illustration), thyristor 22 becomes reverse biased as described above, and accordingly ceases to conduct. Therefore, there is again positive turnoff of the thyristor, with consequent high-frequency capability.

Also, during the period of conduction of thyristor 22, the diode 26 operates to clamp the voltage as stated above relative to diode 27. It follows that, during the first-mentioned pulse, diode 26 operates to steer or direct the current whereas diode 27 performs a clamping function. During the second-mentioned pulse, diode 27 operates to steer the current whereas diode 26 performs a clamping function.

The circuit 33 then supplies a gating signal to thyristor 18 to cause repetition of the first-described voltage and current pulses, except that the voltage across capacitor 32 changes (due to the indicated polarity reversal) by approximately 300 volts instead of 150. Stated otherwise, the first-described pulse only charges the capacitor from zero to 150 volts, with consequent passage of a relatively weak current pulse through the earth 11. However, during the second and every subsequent pulse, the capacitor voltage changes from approximately 150 volts in one direction to approximately 150 volts in the other, with consequent voltage doubling action which greatly increases the strength of the current pulse through the earth. The capacitor voltage (after the first pulse) adds to the source voltage to provide the voltage doubling action.

The gating signal indicated in the preceding paragraph preferably occurs at the end of the above-specified "predetermined" time period after firing of thyristor 22. The elapsed time between each two successive pulses is thus the same. Operation then continues, in response to alternate firings of the thyristors, at the proper frequency as discussed below.

It is extremely important that charging of capacitor 32 is, in each instance, effected through the earth 11 or other medium to which the cathode object 10 is exposed. Such earth causes sufficient electrical resistance to be present in each of the above-described charging circuits to insure against damage to any component. There is no need for any auxiliary resistors in any charging circuit. Thus, a substantial saving is effected relative to the components required to create the circuit, and a much greater saving is effected relative to the power requirements of the circuit.

The frequency of operation is adjusted empirically until the maximum throw of voltage is achieved for the particular amount of power supplied by source 13. This is done in the field by making measurements at appropriate points along the pipeline 10 and varying the frequency of operation until the throw is maximized. In this manner, therefore, the number of stations required is maintained at a minimum. If there were no positive turnoff of each thyristor, it would be necessary to operate at a frequency such that turnoff would result from mere cessation of current flow (not reverse biasing). Because of circuit inductance and other factors, the indicated frequency would be low—much lower than is normally required to maximize "throw" as above stated.

EMBODIMENT OF FIGURE 2

The circuit of FIG. 2 is adapted for use particularly in situations wherein the DC source (which may, again, be a suitable rectifier and filter circuit) is not center-tapped. Instead, the DC source 40 has a positive terminal 41 and a negative terminal 42, the potential difference between the which is (for example) 150 volts.

The positive terminal 41 of source 40 is connected through a lead 43 to anode bed 12. Negative terminal 42 is connected through a lead 44 to a connection point 45 on pipe 10. The lead 44 has interposed therein first and second series-related thyristors 47 and 48, the cathode of thyristor 47 being directly connected to terminal 42, and the anode of thyristor 48 being directly connected to point 45 on pipe 10. Thus, both thyristors 47 and 48 face in the same direction, with their cathodes relatively adjacent the source terminal 42.

Bridged around the two thyristors 47 and 48 is a lead 50 having third and fourth thyristors 51 and 52 interposed therein in series relationship relative to each other. Such thyristors are directed in the same manner as are thyristor 47 and 48, so that thyristor 51 has its cathode directly connected to source terminal 42 whereas thyristor 52 has its anode directly connected to pipe 10. Stated more definitely, one end of lead 50 is connected at a circuit point 53 to the portion of lead 44 which lies between terminal 42 and thyristor 47. The other end of lead 50 is connected at a point 54 to the portion of lead 44 which lies between thyristor 48 and connection point 45 on pipe 10.

A capacitor 56 is bridged between the two leads 44 and 50 at points between the thyristors therein. Thus, one side of capacitor 56 is connected to a circuit point 57 which lies on lead 44 between thyristors 47 and 48, whereas the other side of the capacitor is connected to a circuit point 58 which lies on lead 50 between thyristors 51 and 52.

A clamping diode 60 is connected between lead 43 and the portion of lead 50 which extends to circuit point 54. The cathode of such diode is connected to lead 43.

The triggering or gating circuit for the thyristors 47–48 and 51–52 is indicated at 61 and has a suitable output connected to the gate of each thyristor. Thus, two outputs from the trigger circuit 61 are connected through leads 62 and 63 to the gates of thyristors 47 and 51, respectively. Two other outputs of such circuit 61 are connected through leads 64 and 65 to the gates of thyristors 48 and 52, respectively.

The construction of the trigger or gating circuit 61 (which is of the variable-frequency type as indicated relative to the previous embodiment, and in order that the frequency of the pulses may be varied as desired in order to maximize throw) is such that thyristors 47 and 52 are gated simultaneously with each other. Thereafter, thyristors 48 and 51 are gated simultaneously with each other. Such simultaneous triggering of thyristors 47 and 52, in alternation with simultaneous triggering of thyristors 48 and 51, preferably occurs at regular intervals and at a frequency such as 3,000–4,000 Hz.

In the operation of the embodiment of FIG. 2, let it be assumed that the frequency of operation of gating or trigger source 61 has been adjusted, as stated relative to the previous embodiment, in order to maximize throw. Let it also be assumed that thyristors 47 and 52 are first gated (simultaneously with each other, and prior to gating of thyristors 48 and 51 as stated above). A circuit is thus completed from positive terminal 41 through lead 43 to anode bed 12, thence through the earth 67 to pipe 10, thence through connection point 45 and lead 44 to circuit point 54, thence through a portion of lead 50 to thyristor 52, thence through circuit point 58 and capacitor 56 to circuit point 57, and thence through thyristor 47 to negative source terminal 42.

Thus, as is required for cathodic protection, current flows from the anode bed 12 to the pipe 10. This current effects charging of the capacitor 56. When capacitor 56 charges to a value slightly greater than the source voltage (150 volts in the present example), it effects reverse biasing of the two triggered thyristors 47 and 52 to cause the same to cease conducting. As before, this is positive turnoff and permits high-frequency operation. The clamping diode 60 is effective to clamp the voltage at a value slightly greater than the source voltage, thus preventing an excessive voltage from building up across the capacitor 56.

After cessation of the voltage and current pulses indicated in the two preceding paragraphs, gating source 61 delivers gating pulses simultaneously to thyristors 48 and 51. A circuit is then completed from positive source terminal 41 through the same path described above to circuit point 54, thence through thyristor 48 to circuit point 57, thence through capacitor 56 to circuit point 58, and thence through thyristor 51 and a portion of lead 50 to circuit point 53 and negative terminal 42.

The direction of current flow through capacitor 56 being thus the reverse of that stated above, capacitor 56 first discharges and them immediately recharges to the opposite polarity, therefore providing the voltage-doubling function set forth relative to the previous embodiment. As soon as capacitor 56 achieves a voltage slightly greater than source voltage, thyristors 48 and 51 become reverse biased and therefore are positively turned off. As before, diode 60 acts to clamp the voltage and prevent excessive buildup across the capacitor 56.

The capacitor means is, as described above, charged by current passing through the earth or other medium. It is emphasized that the capacitor means also discharges through such medium. The discharging through the medium is immediately followed by recharging through the medium and to the opposite polarity. This produces highly efficient operation, without resistors in the power circuit, and with voltage doubling. Because the thyristors are positively turned off, relatively high-frequency operation at the necessary frequency is made possible and practical.

A full equivalent of the circuit of FIG. 2 results if the four thyristors are interposed in the positive leg of the circuit (i.e., in lead 43) instead of in the negative leg thereof. The thyristors are then reversed, so that the anodes thereof are relatively adjacent terminal 41.

We claim:

1. A circuit for effecting cathodic protection of an object exposed to an electrically conductive medium, said medium being in electrical contact with anode means located in spaced relationship from said object, which comprises:
   a. a first lead connecting said anode means to the positive terminal of a source of DC voltage,
   b. a second lead connecting said object to the negative terminal of said source,
   c. one of said first and second leads having interposed therein the anodes and cathodes of first and second series-related thyristors poled to conduct current from said positive terminal through said anode means and object to said negative terminal,
   d. a third lead connected in parallel-circuit relationship relative to said one lead,
   said third lead having interposed therein the anodes and cathodes of third and fourth series-related thyristors poled to conduct current from said positive terminal through said anode means and object to said negative terminal,
   e. a fourth lead connected at one end to said one lead at a point between the cathode of said first thyristor and the anode of said second thyristor,
   the other end of said fourth lead being connected to said third lead at the point between the cathode of said third thyristor and the anode of said fourth thyristor, said fourth lead having capacitor means interposed therein, and
   f. a gating circuit connected to the gates of all of said thyristors,
   said gating circuit being adapted to effect simultaneous gating of said first and fourth thyristors, followed by simultaneous gating of said second and third thyristors, and to repeat said gatings in alternation and at a desired relatively high frequency.

2. The invention as claimed in claim 1 in which a clamping diode is connected between said first lead and said second lead, the cathode of said clamping diode being connected to said first lead.

3. A method of effecting pulsed cathodic protection of an object exposed to an electrically conductive medium which comprises:
   providing in electrical contact with said medium and in spaced relationship from said object an anode means through which current may be passed to said medium and thus to said object,
   providing a capacitor means,
   effecting charging of said capacitor means by current flowing from a DC source through a path which includes said medium and also includes said object and said anode means,
   said current flow being effected in a direction such as to effect cathodic protection of said object,
   thereafter effecting discharging of said capacitor means through a path which includes said medium and also includes said object and said anode means,
   the direction of flow of current resulting from said discharging of said capacitor means being such as to effect cathodic protection of said object, and
   repeating said charging and discharging of said capacitor means rapidly at a desired frequency in order to effect pulsed cathodic protection of said object.

4. The invention as claimed in claim 3, in which said method further comprises varying the frequency of said charging and discharging of said capacitor means until the maximum voltage throw is achieved relative to said object.

5. The invention as claimed in claim 4, in which said object is an elongated pipe means and in which said medium is earth.